(No Model.)
J. K. TREMAIN.
CAR BRAKE.
No. 249,272. Patented Nov. 8, 1881.
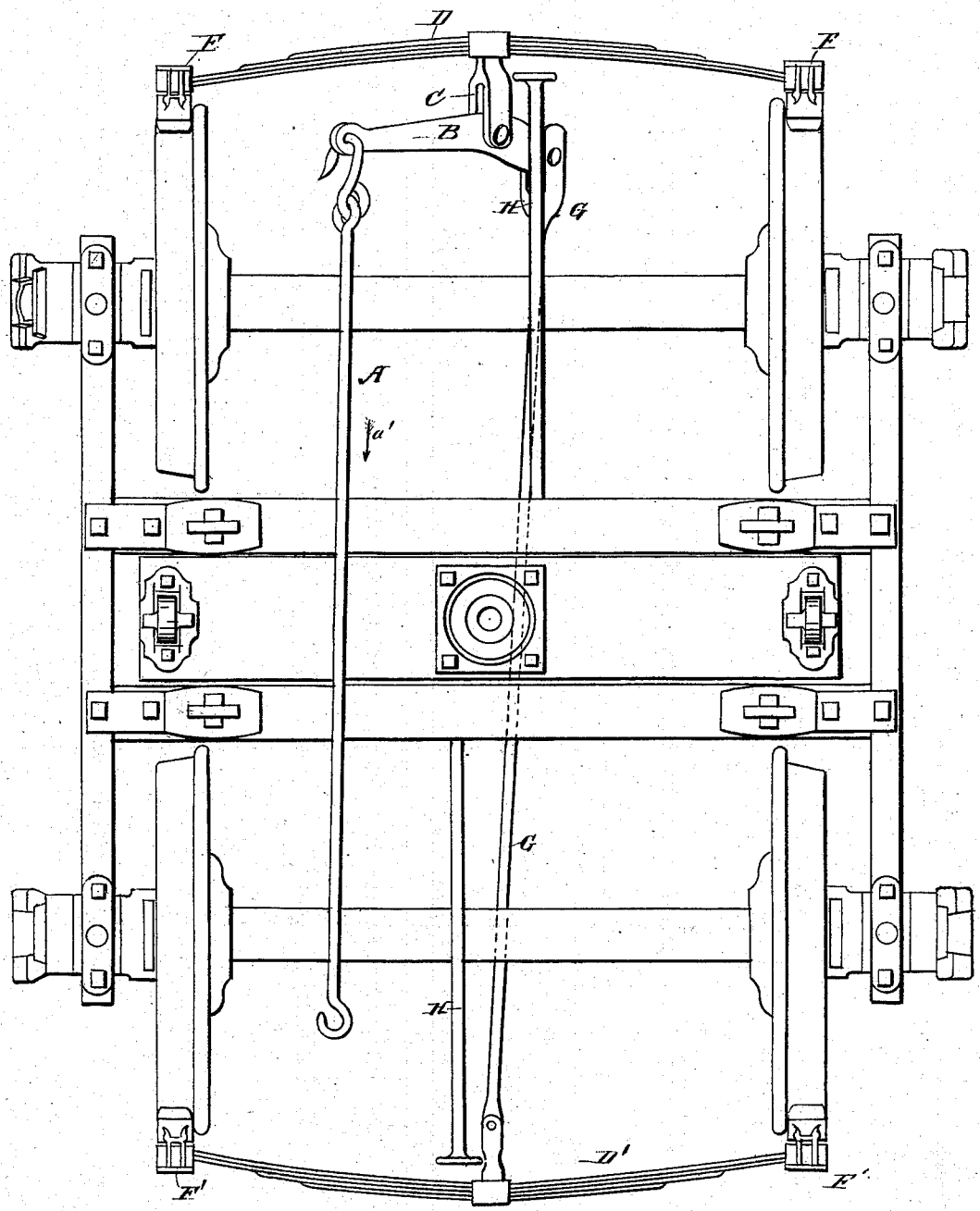
WITNESSES:
Francis McArdle,
J. H. Scarborough.
INVENTOR:
J. H. Tremain
BY Munn & Co
ATTORNEYS.

United States Patent Office.

JAMES K. TREMAIN, OF MILWAUKEE, WISCONSIN.

CAR-BRAKE.

SPECIFICATION forming part of Letters Patent No. 249,272, dated November 8, 1881.

Application filed July 5, 1881. (No model.)

*To all whom it may concern:*

Be it known that I, JAMES K. TREMAIN, of Milwaukee, in the county of Milwaukee and State of Wisconsin, have invented an Improved Spring-Brake Attachment, of which the following is a specification.

The invention consists in a spring of any desired construction interposed between the brake rod or lever and the brake-shoe.

In the accompanying drawing a plan view of a car-truck provided with one construction of my improved spring-brake attachment is shown.

The brake-rod A is attached to the outer end of a lever, B, which is pivoted to the jaws C, attached to a spring, D, the ends of which are attached to the brake-shoes F. The opposite end of the lever B is connected by a rod, G, with the spring D', the ends of which are attached to the brake-shoes F' at the opposite end of the truck. A check-rod or buffer, H, projects from the center of the truck toward each end, and is of such length that the springs D D' will rest against the ends of the rods H when these springs are drawn to a straight line. If the brake-rod A is drawn in the direction of the arrow a', the springs D D' will press the brake-shoes F F' against the wheels with such force that these shoes cannot slide the wheels, thereby preventing the rapid wearing off and sliding of the wheels.

I have shown only one application of the springs as an example, but may apply them in various different ways. For instance, the brake-shoes may be connected by a bar in place of the springs D D', and this bar may be connected with the brake-rod by means of a spring (spiral or other kind) attached both to this connecting-bar and to the brake-rod A; or the brake-shoes may be connected by means of a bar, in the manner just described, which bar is connected directly with the brake-rod A, but the springs (either spiral or other kind) may be interposed between the ends of this bar and the brake-shoes.

Having thus fully described my invention, I claim as new and desire to secure by Letters Patent—

1. A leaf spring bar, D, carrying brake-shoes E E at its extremities, in combination with a stop or check-rod, for the purpose specified.

2. The check-rods H, projecting from the center of truck toward each end, as and for the purpose specified.

JAMES K. TREMAIN.

Witnesses:
W. R. McELROY,
G. McWHORTER.